United States Patent [19]

Hein et al.

[11] Patent Number: 4,649,065

[45] Date of Patent: Mar. 10, 1987

[54] PROCESS FOR PRESERVING WOOD

[75] Inventors: Richard W. Hein, Hudson, Ohio; William C. Kelso, Coldwater, Miss.

[73] Assignee: Mooney Chemicals, Inc., Cleveland, Ohio

[21] Appl. No.: 752,881

[22] Filed: Jul. 8, 1985

[51] Int. Cl.$^4$ .................. A01N 55/02; B05D 1/18; B05D 3/12

[52] U.S. Cl. ...................... 427/370; 106/18; 427/440; 428/541

[58] Field of Search ............... 424/141, 145; 427/297, 427/298, 440, 370; 106/18; 428/541

[56] References Cited

U.S. PATENT DOCUMENTS

| | | | |
|---|---|---|---|
| 2,668,779 | 2/1954 | Herman | 117/59 |
| 2,951,789 | 9/1960 | McCants | 167/38.5 |
| 2,955,949 | 10/1960 | Kirschenbaumn et al. | 106/264 |
| 3,244,586 | 4/1966 | Rigierink | 167/33 |
| 3,271,693 | 9/1966 | Harrison | 167/22 |
| 3,677,805 | 3/1970 | Barnett, Jr. | 117/102 |
| 3,967,276 | 7/1976 | Allen | 427/297 |
| 4,001,400 | 1/1977 | Hager | 424/134 |
| 4,193,993 | 3/1980 | Hilditch | 424/141 |
| 4,303,705 | 12/1981 | Kelso | 427/440 X |
| 4,305,978 | 12/1981 | Hager | 427/351 |
| 4,374,852 | 2/1983 | Hilditch et al. | 424/289 |
| 4,388,215 | 6/1983 | Ishida et al. | 252/402 |
| 4,507,152 | 3/1985 | Collins et al. | 106/18.35 X |
| 4,532,161 | 7/1985 | Collins et al. | 427/440 |
| 4,539,235 | 9/1985 | Collins et al. | 106/18.35 |

FOREIGN PATENT DOCUMENTS

| | | |
|---|---|---|
| 5991 | 12/1979 | European Pat. Off. . |
| 1528804 | 7/1968 | France . |
| 756685 | 9/1956 | United Kingdom ............ 81/1 |
| 809708 | 3/1959 | United Kingdom ............ 81/1 |
| 972198 | 10/1964 | United Kingdom . |
| 1461630 | 1/1977 | United Kingdom . |
| 1574939 | 9/1980 | United Kingdom . |
| 2049430 | 5/1982 | United Kingdom . |

OTHER PUBLICATIONS

A Survey of the Properties of Commercial Water Repellents and Related Products, United States Department of Agriculture, Forest Service, Forest Products Laboratory, Report No. R1495.

Bennett, H., Industrial Waxes, Chemical Publishing Company, Inc., vol. I, 1975.

Meyer, J. A., The Chemistry of Solid Wood, The American Chemical Society (1984), pp. 257–261.

Kirk-Othmer, Concise Encyclopedia of Chemical Technology, John Wiley & Sons (1985), pp. 466–481.

Mississippi State University, MSU Process, Forest Products Laboratory, 1977, 15 pages.

*Primary Examiner*—Michael R. Lusignan
*Attorney, Agent, or Firm*—Renner, Otto, Boisselle & Lyon

[57] ABSTRACT

An improved process for preserving wood by impregnating the wood with metal salts is described. More particularly, the improved process comprises the steps of (A) contacting wood in a vessel with a solution containing at least one soluble metal salt of an organic carboxylic acid under conditions of time, temperature and pressure which are sufficient
 (i) to effect penetration of the solution into the wood, and
 (ii) to maintain the metal:acid ratio in the solution removed from the wood in step (B) substantially the same as the metal:acid ratio in the solution used to impregnate the wood in this step (A), (B) removing at least some of the solution from the wood by reducing the pressure within the vessel, and (C) subsequently heating the wood to a temperature sufficient to fix the metal to the wood.

The solutions utilized in the above process may be either aqueous solutions or hydrocarbon solutions, and the solutions may contain other desirable components in addition to the metal salts such as insecticides, flame retardants, water repellants, etc. In a preferred embodiment, the metal salt of the organic carboxylic acid utilized in the process is a fungicide.

23 Claims, No Drawings

PROCESS FOR PRESERVING WOOD

FIELD OF THE INVENTION

The present invention relates to a process for preserving wood. More particularly, the process of the present invention involves a sequence of steps under controlled conditions of time, temperature and pressure, and in particular, temperature. The invention also relates to wood treated in accordance with the process of the invention.

In order to prevent decay of wood and timbers, and thereby increase their life, it is common practice to impregnate the wood or timbers with a preservative such as creosote, mixtures of inorganic compounds which are dissolved or dispersed in water, or certain organic compounds which are dissolved in petroleum distillates. The protection afforded by the application of these materials is dependent upon deep and reasonably uniform penetration into the wood or timber by the preservative material.

The subject of wood treatment and wood preservation is discussed in some detail in the two volume treatise entitled "Wood Deterioration and its Prevention by Preservative Treatments", Darrel D. Nicholas, Editor, Syracuse Wood Science Series 5, Syracuse University Press, Syracuse, N.Y., 1973. Among the examples of wood preservatives described therein are various creosote compositions, pentachloro-phenol, copper naphthenate, copper-8-quinolinolate, organotin compounds, organomercury compounds, zinc naphthenate, chlorinated hydrocarbons, ammoniacal copper arsenite (ACA), acid copper chromate (ACC), zinc salts such as zinc chloride, zinc oxide and zinc sulfate, chromated copper arsenate (CCA), etc.

Processes and equipment for treating wood are discussed in Volume II, Chapter 3, pages 279-298. The pressure treatment is described as the most effective method of protecting wood against attack of decay, insects, fire, etc. Non-pressure treatments also are discussed in this chapter. Dipping is suggested primarily as a satisfactory surface treatment although some penetration is observed. Another non-pressure technique is the diffusion process with unseasoned wood. The author indicates the process requires long treating periods because of slow diffusion rates.

Wood preservatives such as those described above have been applied to the wood as solutions, emulsions, pastes or dispersions in liquid hydrocarbons and/or aqueous systems. In many applications, the use of aqueous systems is preferred over liquid hydrocarbons because of the odors, flammability and often toxic nature of the liquid hydrocarbons. U.S. Pat. No. 4,507,152 describes aqueous compositions having fungicidal and insecticidal properties which can be used in the treatment of wood. The aqueous compositions comprise oil soluble metal salts of organic carboxylic acids, halopyridyl phosphates and surfactants. The compositions can be utilized to penetrate both dry and green wood, and the wood treated with this aqueous system is resistant to fungi and insects.

Wood preservatives which are utilized as aqueous ammoniacal solutions of fatty acid salts are described in U.S. Pat. No. 4,001,400, and aqueous solutions of metal salts of carboxylic acids and ammonia and/or ammonium compounds are described in U.S. Pat. No. 4,193,993. The ammonia and/or ammonium compounds are utilized to maintain the metal salt in solution. British Patent Specification GB No. 2049430 describes water-based fungicidal compositions which comprise a cuprammonium complex of a $C_{1-4}$ monocarboxylic acid and a $C_{1-4}$ monocarboxylate of a metal selected from an alkaline earth metal, zinc and manganese. The compositions are useful for treating crops such as vines, coffee, tea, apples, pears, etc., and the compositions may be used as paint biocides and as wood preservatives.

A technique for utilizing aqueous systems of polyhalophenols is described in U.S. Pat. No. 4,090,000. Briefly, the method involves the use of an aqueous solution containing a water-soluble salt of the polyhalophenol and an acid forming material which can undergo a reaction in the solution to liberate an acid which displaces the polyhalophenol from said salt after the solution is impregnated into the wood.

Regardless of the impregnating chemical system employed, the most common commercial procedure for impregnating wood involves subjecting wood to the preservative under relatively high pressures such as 150 to 200 pounds to the square inch for a substantial period of time such as from one hour to 24 hours. The process also may require relatively high temperatures such as from about 75° C. to about 90° to 95° C. Moreover, the application of pressure can cause compression of the outer layers of the wood, particularly after wood is weakened and softened by steaming. The collapse of the wood cells is likely to occur especially when relatively soft, unseasoned wood of low specific gravity is being treated. On collapse of the wood cells in an area, there is formed a relatively impenetrable layer which restricts or even completely blocks the flow of preservatives into the interior of the wood.

It also has been suggested to improve the method of pressure treatment by first subjecting the wood to a vacuum treatment. Examples of prior art patents describing methods of impregnating wood utilizing a vacuum followed by pressure include U.S. Pat. Nos. 2,668,779; 3,200,003 and 3,968,276.

U.S. Pat. No. 3,677,805 describes a modification of the pressure treatment. In this procedure, the wood is immersed in a treatment liquid inside a pressure vessel, and the pressure is increased to operating pressure whereupon the contents of the vessel then are subjected to the action of a pulsating pump which provides sinusoidal pressure pulses within the vessel. In other words, pressure pulses are applied repetitively in modulated amplitude to provide variable pressure peaks above and below the ambient pressure maintained in the pressure vessel. This procedure requires equipment which includes a pulsating pump operating into a pressure vehicle equipped with a pressure release means.

As mentioned above, the most common commercial procedure for impregnating wood involves subjecting the wood to the preservative under relatively high pressures and sometimes at relatively high temperatures. Normally, the procedure involves placing the wood in a vessel, filling the vessel with the preservative mixture and raising the pressure within the vessel to the desired level to effect penetration of the solution into the wood. Sometimes, the temperature of the liquid within the vessel is raised to an elevated temperature. After the wood has been subjected to the penetrating system for the desired period of time, the pressure is reduced, generally, to atmospheric pressure, and as the pressure is reduced, some of the penetrating solution contained in the wood is forced out of the wood by expansion of the air within the wood as the external pressure is reduced. This penetrating solution which is released and recovered from the wood as the external pressure is reduced is generally referred to in the art as "kickback". When the term is used in this application, it shall have the same meaning. We have observed in processes where the penetrating solution contains metal salts of carboxylic acids that the kickback often contains less metal and more carboxylic acid than was originally in the penetrating solution. The compositional change in the kickback is a problem because the kickback generally is mixed with the original solution in the vessel thereby resulting in an overall reduction in metal content and an increase in acid. Although the decrease in metal concentration in the solution can be adjusted by adding additional metal salt, the increased amount of free acid within the solution cannot be easily removed, and the concentration continues to build up as the process is continued. In addition to the dilution effect caused by the increased acid, the surplus of acid present in the mixture can lead to mild steel corrosion problems in wet systems.

The above-described prior art represents a small sampling of the suggestions which have been made for treating wood with water and/or preservative materials to prevent decay. In spite of these many suggestions made in the prior art, there continues to be a need for inexpensive, safe, non-toxic, and non-corrosive treatment which is effective and which results in the uniform penetration of the preservative and other chemicals to the core of the wood.

SUMMARY OF THE INVENTION

An improved process for preserving wood by impregnating the wood with metal salts is described. More particularly, the improved process comprises the steps of (A) contacting wood in a vessel with a solution containing at least one soluble metal salt of an organic carboxylic acid under conditions of time, temperature and pressure which are sufficient (i) to effect penetration of the solution into the wood, and (ii) to maintain the metal:acid ratio in the solution removed from the wood in step (B) substantially the same as the metal:acid ratio in the solution used to impregnate the wood in this step (A), (B) removing at least some of the solution from the wood by reducing the pressure within the vessel, and (C) subsequently heating the wood to a temperature sufficient to fix the metal to the wood.

The solutions utilized in the above process may be either aqueous solutions or hydrocarbon solutions, and the solutions may contain other desirable components in addition to the metal salts such as insecticides, flame retardants, water repellants, etc. In a preferred embodiment, the metal salt of the organic carboxylic acid utilized in the process is a fungicide.

DESCRIPTION OF THE PREFERRED EMBODIMENTS

The present invention is an improved process for preserving wood by impregnating wood with metal salts under pressure conditions. The improved process utilizes a sequence of steps conducted under controlled conditions of time, temperature and pressure which are sufficient to effect penetration of the solution into the wood while maintaining the metal:acid ratio in the kickback solution substantially the same as the metal:acid ratio in the original penetrating solution.

More specifically, the improved process of the present invention comprises the steps of (A) contacting wood in a vessel with a solution containing at least one soluble metal salt of an organic carboxylic acid under conditions of time, temperature and pressure which are sufficient (i) to effect penetration of the solution into the wood, and (ii) to maintain the metal:acid ratio in the solution removed from the wood in step (B) substantially the same as the metal:acid ratio in the solution used to impregnate the wood in this step (A), (B) removing at least some of the solution from the wood by reducing the pressure within the vessel, and (C) subsequently heating the wood to a temperature sufficient to fix the metal to the wood.

The term "solution" is used throughout this specification and in the appended claims to refer to not only true solutions, but also to emulsions, micro-emulsions, and the like. When such emulsions, microemulsions, etc., are used, the term "soluble metal salt" refers to the fact that the salt is soluble in at least one of the phases of such emulsions, micro-emulsions, etc.

A critical feature of the improved process of the present invention is the first step identified as step (A). We have discovered that the desired improved results are obtained if the temperature of the solution utilized in step (A) is maintained at a temperature which is insufficient "to fix the metal to the wood". The expression "to fix the metal to the wood" means that the metal salt which is impregnated into the wood by the process of the present invention does not leach out of the wood upon continued exposure to water and/or hydrocarbon solvents. It is not entirely clear and is subject to considerable conjecture among those skilled in the art as to whether the fixing of the salt to the wood is a result of a chemical reaction between the metal salt and functional groups contained within the cellulosic structure or the lignin or other reactive materials contained in the wood or if the fixing of the metal salt is a physical phenomenon which is accelerated by elevating the temperature. Because in some instances, the kickback obtained from empty cell processes contains less metal and more acid than was contained in the treating solution, this supports the theory that the fixing of the metal to the wood and the release of free acid results from a chemical exchange between the metal of the metal salt with a hydrogen-containing active group in the cellulosic structure of the wood which thereby releases free acid.

In the present process, the temperature and pressure conditions maintained in step (A) are controlled to maintain the metal:acid ratio in the kickback solution subsequently removed from the wood in step (B) substantially the same as the metal:acid ratio in the solution used to impregnate the wood in step (A). In a preferred embodiment, the desirable result in step (A) is obtained by maintaining the temperature of the penetrating solution in step (A) at a temperature below the temperature at which fixing of the metal to the wood occurs. In one embodiment, the temperature of the solution utilized in step (A) is maintained generally between about 20° to about 80° C. Higher temperatures may be employed with some metal salt solutions so long as the metal salt does not become fused to the wood as evidenced by a reduced metal concentration and increased acid concentration in the kickback. The pressure within the vessel in step (A) can be varied over a wide range, and this pressure generally will be a pressure greater than 0 psig up to about 200 psig. The amount of pressure within the vessel controls the rate of penetration of the solution into the wood, and, if lower pressures are utilized, step (A) is continued for longer periods of time until the desired amount of penetration is obtained. Similarly, if temperatures utilized in step (A) are at the lower end of the range of 20° to about 80° C., then step (A) is conducted for longer periods of time.

After the penetrating solution is penetrated into the wood to the extent desired, at least some of the penetrating solution is removed from the wood by reducing the pressure within the vessel. In this second step (step (B)), as the pressure within the vessel is reduced, the air within the wood expands thereby releasing and forcing at least some of the penetrating solution from the wood. This released solution is the kickback which becomes mixed with the original treating solution.

The impregnated wood then is treated to the third step (step (C)) which involves heating the wood to a temperature which is sufficient to fix the metal to the wood. Although the temperatures utilized in step (C) may vary depending upon the nature of the metal salt utilized in the process, the temperatures which are sufficient generally to fix the metal to the wood are in the range of from about 90° C. up to about the decomposition temperature of wood or about 120° C.

The heating of the wood in step (C) may be conducted in the presence of a mixture of treating solution and the kickback removed in step (B), and in such instances, the mixture serves as the heat transfer medium within the vessel. When the mixture of solutions is utilized as a heat transfer medium, the heating in step (C) preferably is conducted at a constant pressure which may be atmospheric pressure or a slightly elevated pressure. The use of a constant pressure in step (C) is preferred in order to minimize any further transfer of materials from the wood to the solution including any free acid formed as a result of the fixing of the metal to the wood. Obviously, a precise constant pressure is not practical or required, and it is only desirable that the pressure be maintained substantially constant and the pressure may be varied by a factor of about ±2 psig.

In one alternative embodiment, the mixture of solutions resulting from step (B) can be drained from the vessel and replaced by another inert liquid substance such as a mineral oil prior to subjecting the wood to the heating in step (C). In this embodiment, the oil serves as a heating medium, and the mixture of solutions drained and recovered from step (B) can be utilized in a subsequent wood treating process. This is a preferred embodiment when the mixture from step (B) is in the form of an emulsion and the temperature used in step (C) is likely to result in a phase separation.

In another embodiment, the mixture of solutions obtained in step (B) can be removed from the vessel at the end of step (B), and the wood can be heated in step (C) with, for example, steam as a heat transfer medium. This embodiment is less preferred than the above embodiments because the steam is not as effective a heat transfer medium as the mixed solutions or the oil, and the use of steam can result in leaching of the impregnated metal salts before they can be fixed to the wood. This embodiment is, however, a preferred embodiment when the mixture of solutions obtained from step (B) is in the form of an emulsion and the temperature used in step (C) is likely to result in a phase separation.

The solutions which are utilized as penetrating solutions in step (A) of the present invention may be either hydrocarbon solutions or aqueous solutions. As indicated above, these solutions can also be emulsions or micro-emulsions. The continuous phase of such emulsions and micro-emulsions can be either hydrocarbon or aqueous. The amount of metal salt included in the solutions utilized in step (A) generally will be an amount sufficient to provide a metal content in the solution of from about 0.1 to about 5% by weight of metal based on the weight of the solution.

In one preferred embodiment, the solutions are solutions of the metal salt in a hydrocarbon solvent. Examples of hydrocarbon solvents useful include aromatic as well as aliphatic solvents, and mixtures of aromatic and aliphatic hydrocarbons. Specific examples of hydrocarbon solvents include mineral spirits, naphtha, light mineral oil, xylene, toluene, and commercial mixtures of hydrocarbon solvents such as petroleum hydrocarbons. Oxygenated hydrocarbons such as alcohols, ketones, ethers, and esters are also useful as hydrocarbon solvents.

When hydrocarbon solutions are utilized in the process of the present invention, the metal salts preferably are oil-soluble or hydrocarbon-soluble salts. The oil-solubility of the metal salts of the invention is believed to contribute to the advantageous and desirable results which are obtained. Since the organic compound is oil-soluble and essentially hydrophobic, it therefore, does not have a tendency to be extracted or leached from the treated wood even over an extended period of time.

Particularly preferred types of oil-soluble metal salts which are useful in the aqueous systems of the present invention are the acid, neutral and basic salts of organic carboxylic acids. These salts also are known in the art as "soaps".

The choice of metal contained in the salts will depend upon the properties which are desired to be imparted to the wood being treated, availability, cost and effectiveness. Certain metals are more commonly used in the method of the invention, and these include, copper, zinc, zirconium, chromium, iron, antimony, lead and mercury. Salts containing a mixture of the ions of two or more of these metals also can be used.

As mentioned, the salts can be acid, neutral or basic. The acid salts contain insufficient metal cation to neutralize the acid. The neutral salts contain an amount of metal cation just sufficient to neutralize the acidic groups present in the salt anion. The basic salts contain an excess of metal cation and are often referred to as overbased, hyperbased or superbased salts. These acid, basic and neutral salts preferably are of oil-soluble organic carboxylic acids and mixtures of such acids.

The carboxylic acids from which suitable acid, neutral and basic salts can be prepared include aliphatic, cycloaliphatic and aromatic mono- and polybasic carboxylic acids. The organic carboxylic acids can be either natural or synthetic or mixtures thereof. The examples of natural acids, although usually refined, include straight and branched chain carboxylic acids and mixtures such as tall oil acids and cyclic carboxylic acids such as naphthenic acids. A variety of synthetic carboxylic acids, and particularly aliphatic carboxylic acids or mixtures thereof is useful, and these generally contain six or more carbon atoms.

The metal salts or soaps can be prepared by fusion or precipitation methods. The soaps normally are prepared in an inert liquid medium such as a hydrocarbon oil or solvent. The organic carboxylic acids generally will have at least six carbon atoms and as many as 30 carbon atoms, but when more than one carboxylic acid is employed, carboxylic acids containing as little as two carbon atoms may be employed as one of the acids of the mixture. Examples of useful organic carboxylic acids include acetic acid, propionic acid, butyric acid, isopentanoic acid, hexoic acid, 2-ethyl butyric acid, nonylic acid, decanoic acid, 2-ethylhexoic acid, isooctanoic acid, isononanoic acid, neodecanoic acid, lauric acid, palmitic acid, stearic acid, oleic acid, linoleic acid, naphthenic acid, and commercially available mixtures of two or more carboxylic acids such as naphthenic, tall oil acids, rosin acids, etc.

Examples of acid salts are acid copper salts containing less than a stoichiometric equivalent of copper per acid equivalent. For metals other than copper, the basic salts or soaps are preferred since these contain higher amounts of metal. For example, solutions of normal zinc salts of monocarboxylic acids such as neodecanoic acid contain about 6% zinc by weight whereas a solution of a basic zinc neodecanoate can contain up to about 16% by weight or more of zinc.

Basic metal salts or soaps of carboxylic acids also can be prepared by methods well known in the art. Examples of neutral and basic salts and of metal salt complexes as well as their preparation can be found in, for example, U.S. Pat. Nos. 2,251,798; 2,955,949; 3,723,152 and 3,941,606 which disclosures are hereby incorporated by reference. Some of the basic salts have been referred to as complexes because they are not simple salts. For example, the basic compositions described in U.S. Pat. No. 3,941,606 are referred to as "metal carboxylate-alkoxy alcoholate" complexes. For the purpose of this invention such basic complexes are to be included in the term metal salts or soaps as used in this specification and claims.

Specific examples of the salts or soaps which are useful in the invention include those described below in Table I and the following specific examples.

TABLE I

| | Carboxylate Metal Salts | | |
|---|---|---|---|
| Component | Metal | Metal Content (wt. %) | Acid |
| S-1 | Cu | 16 | neodecanoic |
| S-2 | Cu | 11 | neodecanoic |
| S-3 | Cu | 10 | naphthenic |
| S-4 | Zn | 18 | 2-ethyl hexoic |
| S-5 | Zn | 8 | naphthenic |
| S-6 | Zn | 10 | mixture of $C_8$—$C_{13}$ |

The preparation of the above-described metal salts is illustrated by the following examples wherein all parts and percentages are by weight unless otherwise stated.

EXAMPLE S-1

A mixture of 260 parts of crude neodecanoic acid, 103 parts of propionic acid, 400 parts of mineral spirits, 172 parts of copper powder, 91 parts of Methyl Cellosolve, 14 parts of dipropylene glycol, 70 parts of water, 10 parts of octyl-phenoxy polyethoxy ethanol (Triton X-15 from Rohm & Haas Company) and 3 parts of Santoflex-77 is prepared and sparged with air while heating to a temperature of about 80° C. Reaction under these conditions continues for about 6 hours. A small amount of boric acid (7 parts) is added and the heating is continued at 80° C. with air sparging. The reaction is continued at this temperature until 180% acid neutralization is achieved (total, 14 hours). The mixture is heated for an additional 2 hours at a temperature of about 150° C. to 190% acid neutralization. The air blowing is terminated, and an inert nitrogen atmosphere is employed while the mixture is slowly heated to about 150° C. over a period of 8 hours while excess water is removed.

Four approximately equal proportions of amyl phosphate totalling 176 parts are added at 3-hour intervals while maintaining a temperature of about 145° C. and a nitrogen atmosphere. The mixture then is cooled to about 125° C., settled to remove excess copper and filtered.

The filtered product can be heated under vacuum to a temperature of about 150° C. in order to remove the mineral spirits to yield the desired concentration of metal.

The compositions of Examples S-2 through S-6 in Table I can be prepared by methods similar to those described above for S-1 or by alternative procedures known in the art.

EXAMPLE S-7

A mixture of 840 parts of distilled naphthenic acid, 176 parts of 2-ethyl hexoic acid, 512 parts of mineral spirits, 48 parts of Carbitol (a diethylene glycol ether available commercially from Union Carbide Corp.), 4.8 parts of acetic acid, 1.6 parts of water and 10.9 parts of an anti-foam agent is charged to a reactor, and the mixture is heated with agitation to a temperature of about 65° C. The mixture is sparged with carbon dioxide and 214.4 parts of zinc oxide are added to the mixture which is then heated to a temperature of about 105° C. The reaction is continued at this temperature while periodic checks are made for percent zinc, the acid value and percent water. If necessary, the acid value is adjusted to minus 33 to minus 38 for 10% zinc. If the water content is over 0.4%, the mixture is dehydrated.

About 100 parts of filter aid are added with stirring to the mixture which is then filtered. The filtrate is a clear liquid which is adjusted to a zinc content of 10% using mineral spirits to form the desired product.

Carboxylate metal salts of the type described above are available commercially such as from Mooney Chemicals, Inc., Cleveland, Ohio, 44113 under the general trade designations TEN-CEM, CEM-ALL, NAP-ALL, HEX-CEM, LIN-ALL, and NEO-NAP. These mineral spirit solutions can be adapted for use in preparing the penetrating solutions of the present invention by mixing said mineral spirit solutions with additional mineral spirits or other hydrocarbon solvents.

Mixtures of the carboxylic acid salts such as those described in Table I are easily prepared and utilized in accordance with the invention. For example, a mixture in accordance with the invention is prepared from equal parts of components S-1 and S-6 resulting in a mixture containing 8% copper and 5% zinc. A mixture of two parts of component S-1 with one part of component S-6 will contain 10.7% copper and 3.3% of zinc.

The metal salts which are utilized in the solutions of the present invention also may be prepared by conventional procedures such as by the reaction of copper metal or a copper salt with the acid, for example naphthenic acid. When the acid is a liquid, solvents are not generally required. The metal salts prepared in this manner may be either acid or neutral salts as described above and can be dissolved in hydrocarbon solvents for use in the process of the present invention.

Examples of other neutral and basic salts include lead naphthenate, lead neodecanoate, lead 2-ethyl hexoate, lead tallate, zinc tallate, chromium 2-ethyl hexoate, chromium tallate, chromium oleate, antimony octoate, antimony oleate, iron naphthenate, iron tallate, phenyl mercury oleate, mercury dioleate, etc.

Although a wide variety of metal salts can be utilized in the process of the present invention, it generally is preferred that the metal salt utilized in the process is a fungicide, and, accordingly, the metal of the metal salt generally will be at least one of zinc, copper, chromium, zirconium, iron, antimony, lead or mercury. In addition to the metal salts described above, other metal salts known in the art can be applied to wood in accordance with the process of the present invention. For example, metal salt compositions are described in U.S. Pat. No. 4,374,854 which are mixtures of salts of primary and/or secondary saturated acyclic carboxylic acids and a tertiary saturated acyclic carboxylic acid with zinc or copper. Such salts are useful in the process of the present invention.

In another embodiment, the solutions of the metal salts utilized in the process of the present invention may be aqueous solutions. In such instances, it is preferable that the metal salt be a water-soluble metal salt, and such salts have been described in the prior art. A number of water-insoluble metal salts can be rendered water-soluble by dissolving the metal salts in and/or preparing the metal salts in an aqueous ammoniacal solution. Such salts are described in the art such as in U.S. Pat. No. 4,001,400 and U.S. Pat. No. 4,193,993, and the disclosures of these two patents relating to the preparation of such water-soluble salts are hereby incorporated by reference. Additionally, U.S. Pat. No. 4,193,993 describes the preparation of water-soluble metal salts utilizing ammonium salts such as ammonium carbonate, ammonium bicarbonate, and mixtures of such ammonium salts with ammonia.

The solutions which are utilized in step (A) of the present invention can be prepared by techniques known in the art such as by dissolving solid metal salts in the desired solvent which may be either hydrocarbon solvent or water. Alternatively, if the metal salt is available in concentrated solution form, the concentrate can be diluted with appropriate solvent to form the treating or penetrating solution containing the desired amount of the metal salt.

The solutions used in the process of the present invention also may contain other additives which impart desirable properties to the treated wood. For example, the solutions may contain anti-foam agents, surfactants, antioxidants, flame retardant compositions, coloring agents, insecticides, odorants, moldicides, wood stabilizing agents, etc. When included in the water-dispersible compositions, such additives may be present in amounts ranging from about 0.01 to about 20-30%. The amount of such additives included in the solutions of the invention may vary over a rather wide range although amounts of from about 0.01 to about 5% of these compositions generally are satisfactory.

Inorganic fire retardant compositions are particularly useful in the solutions of the invention. Examples of inorganic materials include metal oxides which are well known in the art such as antimony oxide, etc. Examples of organic fire retardants include a number of halogenated and organophosphorus compounds which may be dispersed in the solutions.

Although the wood which can be treated in accordance with the method of the invention may have a satisfactory appearance for most purposes, the appearance can be modified if desired by imparting different color effects. The present invention contemplates the inclusion of coloring agents in the solutions of the invention. Any of the known oil-soluble or water dispersible coloring agents can be used. These agents are mixed either with the concentrates of metal salts described above, or the solutions, and when the wood is immersed in the solutions containing coloring agents, the coloring agents penetrate the wood with the metal salts and give desirable coloring effects which in many instances emphasize the grain of the wood. Examples of coloring agents which may be used depending on the desired results include: Bruco Creosote Brown RGY available from Bruce Chemical Co., Iron Cem-All available from Mooney Chemical Inc., and Pylaklor Red Brown LX-6249 available from Pylam Dye Co.

Insecticides also can be included in the solutions of the invention, and it is preferable that the insecticide either be soluble in oil or water. Examples of such insecticides include Dursban TC available from Dow Chemical and Ficam 76WP available from BFC Chemicals Inc.

Odorants can be included in the solutions used in the process of the invention, and one preferred odorant is pine oil. Other compounds having desired odors can be included in the solutions.

Wood stabilizing agents may be included in the solutions used in the invention to provide the wood with improved dimensional stability. Such agents remain in the cell walls when the wood is dried, and this bulking action prevents the wood from shrinking. Various chemicals have been suggested for this purpose in the art of wood treating. A useful group of stabilizing agents are the polyalkylene glycols, and more particularly, the polyethylene glycols. The molecular weight of the glycols should be selected so that the glycols are soluble in water. Thus, polyethylene glycols having molecular weights of up to about 6000 are desirable because these generally are water soluble. Various of these polyethylene glycols are available commercially.

The process of the present invention comprises the steps of (A) contacting wood in a vessel with a solution containing at least one soluble metal salt of an organic carboxylic acid under conditions of time, temperature and pressure which are sufficient
  (i) to effect penetration of the solution into the wood, and
  (ii) to maintain the metal:acid ratio in the solution removed from the wood in step (B) substantially the same as the metal:acid ratio in the solution used to impregnate the wood in this step (A), (B) removing at least some of the solution from the wood by reducing the pressure within the vessel, and (C) subsequently heating the wood to a temperature sufficient to fix the metal to the wood.

As mentioned, the solution of the metal salt may be either a hydrocarbon solution or an aqueous solution.

Unless otherwise indicated in the following examples and elsewhere in the specification and appended claims, all percentages are by weight, and all temperatures are in degrees centigrade.

EXAMPLE 1

A hydrocarbon solution of copper naphthenate containing 1% copper is prepared by dissolving copper naphthenate in a commercial petroleum hydrocarbon identified as P9, Type A Oil. (Other hydrocarbon solvents being appropriate boiling points can be substituted for the petroleum hydrocarbon).

Step A

A seasoned wood log is placed in a steel pressure vessel. An initial air pressure of 30 psig is applied, and the hydrocarbon solution of copper naphthenate is pumped into the vessel at 30 psig and at a temperature of about 75° F. (24° C.) until the vessel is hydrostatically full. The hydrostatic pressure is increased to 130 psig, and this pressure is maintained for 4 hours.

Step B

The hydrostatic pressure is reduced to about 40–60 psig to allow at least some of the solution which has penetrated into the wood to be released. This released solution (the kickback) mixes with the original solution contained in the vessel. If it is desired to remove additional solution from the wood, the pressure can be further reduced to, for example, 0 psig or −15 psig while maintaining the temperature of the solution within the vessel at about 75° F. (24° C.) or lower.

Step C

When the desired amount of kicback has been obtained, the temperature of the solution within the vessel is raised to about 200° F. (94° C.) at a substantially constant pressure such as 1 psig to fix the copper to the wood. The wood is maintained at this temperature for a period of time which is sufficient to fix the copper, and generally this time will vary from about 1 to about 24 hours and more generally will be from about 4 to about 12 hours. With the particular copper naphthenate solution described above, the fixing of the copper to the wood is evidenced by a change from a Kelly green color to a chocolate brown color.

EXAMPLE 2

The procedure of Example 1 is repeated except that the hydrocarbon solution of copper naphthenate is replaced by an aqueous solution prepared by mixing 56.6 parts of copper carbonate (53% copper), 38.8 parts of ammonium carbonate, 74 parts of an ammonium solution having a specific gravity of 0.88 and 405.1 parts of water at room temperature in accordance with the procedure of Example 11 of U.S. Pat. No. 4,193,993.

The seasoned wood treated in accordance with the process of the present invention such as illustrated in the above examples exhibits improved resistance to fungi, and when the solution is modified to include an insecticide, the wood treated with the solution in accordance with the process of the present invention is resistant to fungi and insects.

COMPARATIVE EXAMPLE A

The procedure of step (A) of Example 1 is repeated, and after completion of step (A), the copper naphthenate treating solution is pumped out of the vessel at 40–60 psig. The pressure then is reduced to about −14 psig to obtain the kickback, still at 75° F. (24° C.). The kickback obtained in this manner is analyzed and is found to contain 1% copper and the solution has a metal:acid ratio of about 0.9 which is about the same as the initial treating solution.

COMPARATIVE EXAMPLE B

The procedure of Comparative Example A is repeated except that the temperature of the solution within the vessel is maintained at about 200[F. (94° C.) during step A. The kickback obtained in this example contains only 0.5% copper, and the metal:acid ratio is only 0.5. This indicates a loss of copper and a gain of acid in the kickback.

As can be seen from the above examples, when the temperature of the solution within the vessel in step (A) is maintained at about 75° F. (24° C.), there is substantially no change in the copper content and the metal:acid ratio in the kickback when compared to the original solution. However, when the temperature of the penetrating solution is substantially higher such as at about 200° F. (94° C.), there is a change in the copper concentration and metal:acid ratio of the kickback which may result from a reaction between the metal salt and reactive groups of the wood. The decrease in the metal:acid ratio indicates a gain of acid which results in an undesirable dilution of the penetrating solution. Moreover, the presence of an increased amount of naphthenic acid is undesirable since naphthenic acid is corrosive to metal.

The process of the invention can be carried out on a wide variety of wood types. The actual time of contact of the wood with the solutions in step (A) will vary depending on a variety of factors such as, for example, (1) the level of pressure within the vessel, (2) the amount of metal salt to be introduced into the wood, (3) the difficulty of penetration into the particular type of wood being treated and (4) whether the wood is green wood or seasoned wood. Any type of wood, dry or green, can be treated with the solutions of the invention. Green wood generally is defined as wood containing 30% or more by weight of water. Dry or seasoned wood is defined as wood containing less than 30% by weight of water based on bone dry wood. Examples of wood species which can be treated in accordance with the method of the invention include Southern Yellow Pine, Western Red Cedar, Douglas Fir, Inland Fir, Spruce, Hemlock, Sugar Maple, Ash, Walnut, Cherry, White Pine, Red Pine, Birch, Red Oak, White Oak, Elm, Hickory, Linden, Beech, Sycamore, etc.

In accordance with the patent statutes, while preferred embodiments and best mode have been described in detail, the scope of the invention is not limited thereto, but rather by the scope of the attached claims.

What is claimed is:

1. An improved process for preserving wood by impregnating wood with metal salts which comprises the steps of
   (A) contacting wood in a vessel with a solution containing at least one soluble metal salt of an organic carboxylic acid under conditions of time, temperature and pressure which are sufficient
      (i) to effect penetration of the solution into the wood, and
      (ii) to maintain the metal:acid ratio in the solution removed from the wood in step (B) substantially the same as the metal:acid ratio in the solution used to impregnate the wood in this step (A),
   (B) removing at least some of the solution from the wood by reducing the pressure within the vessel and mixing said removed solution with the solution in the vessel, and
   (C) subsequently heating the wood to a temperature sufficient to fix the metal to the wood.

2. The process of claim 1 wherein the pressure in step (A) is greater than 0 psig up to about 200 psig.

3. The process of claim 1 wherein the temperature in step (A) is between about 20° to about 80° C.

4. The process of claim 1 wherein the wood is heated in step (C) to a temperature of from about 90° to about 120° C.

5. The process of claim 1 wherein
   (a) the mixed solution is utilized as the heat transfer medium, and
   (b) the heating of the wood is conducted at a substantially constant pressure.

6. The process of claim 1 wherein the solution is a hydrocarbon solution.

7. The process of claim 1 wherein the solution is an aqueous solution.

8. The process of claim 1 wherein the metal content in the solution used in step (A) is from about 0.1 to about 5% by weight.

9. The process of claim 1 wherein the metal of the metal salt is zinc, copper, chromium, iron, antimony, lead, or mercury, or a mixture thereof.

10. The process of claim 1 wherein the acid is at least one aliphatic or alicyclic monocarboxylic acid containing from about 6 to about 30 carbon atoms.

11. The process of claim 1 wherein the salt is a copper or zinc salt.

12. An improved process for preserving wood by impregnating wood with copper or zinc salts of organic carboxylic acids which comprises the steps of
   (A) contacting the wood in a vessel with a solution containing at least one soluble copper or zinc salt of an organic carboxylic acid at a pressure of up to about 200 psig and at a time and temperature which are sufficient,
      (i) to effect penetration of the solution into the wood, and
      (ii) to maintain the metal:acid ratio in the solution removed from the wood in step (B) substantially the same as the metal:acid ratio in the solution used to impregnate the wood in this step (A),
   (B) removing at least some of the solution from the wood by reducing the pressure within the vessel, and mixing said removed solution with the solution in the vessel,
   (C) subsequently heating the wood to a temperature sufficient to fix the metal to the wood, utilizing the mixed solution obtained in step (B) as the heat transfer medium.

13. The process of claim 12 wherein the solution is a hydrocarbon solution.

14. The process of claim 12 wherein the solution is an aqueous solution.

15. The process of claim 12 wherein the salt is a copper salt.

16. The process of claim 12 wherein the wood is contacted with the solution in step (A) at a temperature of up to about 80° C. at a pressure of up to about 150 psig.

17. The process of claim 12 wherein the impregnated wood is heated in step (C) to a temperature of up to about 120° C.

18. The process of claim 12 wherein the copper content in the solution utilized in step (A) is from about 0.1 to about 5% by weight.

19. The process of claim 12 wherein the carboxylic acid is at least one aliphatic or alicyclic monocarboxylic acid containing from about 6 to about 30 carbon atoms.

20. The process of claim 12 wherein the solution is a hydrocarbon solution and the salt is a copper salt.

21. The process of claim 20 wherein the copper salt is a fungicide.

22. The process of claim 12 wherein the solution also contains an insecticide.

23. The process of claim 12 wherein the solution also contains a flame-retardant.

* * * * *